July 31, 1956 W. P. DALRYMPLE 2,756,832
STEERABLE STRUT WITH MOUNTINGS FOR DRIVE MOTOR AND WHEEL
Filed Sept. 5, 1950 7 Sheets-Sheet 1

Inventor
William P. Dalrymple
By Wallace and Cannon
Attorneys

July 31, 1956  W. P. DALRYMPLE  2,756,832
STEERABLE STRUT WITH MOUNTINGS FOR DRIVE MOTOR AND WHEEL
Filed Sept. 5, 1950  7 Sheets-Sheet 2

Fig. 3

Inventor
William P. Dalrymple
By Wallace and Cannon
Attorneys

United States Patent Office 2,756,832
Patented July 31, 1956

2,756,832

STEERABLE STRUT WITH MOUNTINGS FOR DRIVE MOTOR AND WHEEL

William P. Dalrymple, Rochester, N. Y., assignor, by mesne assignments, to Adrienne M. Sherwood, Tarrytown, N. Y.

Application September 5, 1950, Serial No. 183,177

20 Claims. (Cl. 180—33)

This invention relates to a power unit and more particularly to a novel arrangement adapted to be employed as a propulsion means for a vehicle such as a bicycle or a tricycle or the like.

My novel power unit is so constituted and arranged that it may be employed as a front wheel of a bicycle or a tricycle or other vehicle and to enable this to be realized in an efficient and economical manner is a primary object of this invention.

When my novel power unit is employed as a front wheel of a vehicle of the aforesaid character it is essential that a firm connection be established between the vehicle and my unit and to this end it is another object of this invention to mount my novel power unit on a strut that embodies an element that may be mounted in the steering column of the vehicle.

My novel power unit includes an engine and a wheel to be driven thereby and in order to balance the stresses attendant to the driving of such a wheel by such an engine it is advantageous to support these elements from a strut of the aforesaid character in such a way that the stresses impressed on the strut will be effectively dissipated and to enable this to be realized in a novel, efficient and economical manner is yet another object of this invention.

Further objects related to the foregoing are to equip a strut of the aforesaid character with an axle on which the wheel to be driven may be rotatably mounted; and to so arrange the strut and engine of my unit that the engine may be mounted directly on the strut on the side thereof and opposite that from which the axle is projected; to utilize one wall of the crankcase of the engine as the support means for the engine by connecting such wall directly to the strut; and to so mount the engine on the strut that the position thereof may be adjusted on the strut when and as desired.

Still further objects of the invention are to connect a strut of the aforesaid character to the vehicle through a shock absorbing arrangement since so to do assists in dissipating the stresses to which my power unit will be subjected in use; to utilize a combined spring and dashpot arrangement of novel and economical construction as the shock absorbing means; to so arrange the shock absorbing means that it may be mounted in the steering columns and the like of different lengths; to so relate the shock absorbing arrangement and strut to the vehicle that undesirable separation between the vehicle and my power unit will be prevented; and to connect the steering apparatus such as the handlebars of the bicycle, to the shock absorbing arrangement so as to thereby enable my power unit to be employed as a steering element of a bicycle.

Still further objects of this invention are to incorporate a novel brake arrangment in a power unit of the aforesaid character; to utilize the housing of the brake arrangement as a driving element for the wheel in my power unit and to afford an efficient and economical system for manually operating the brake arrangement.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figures 1, 2:
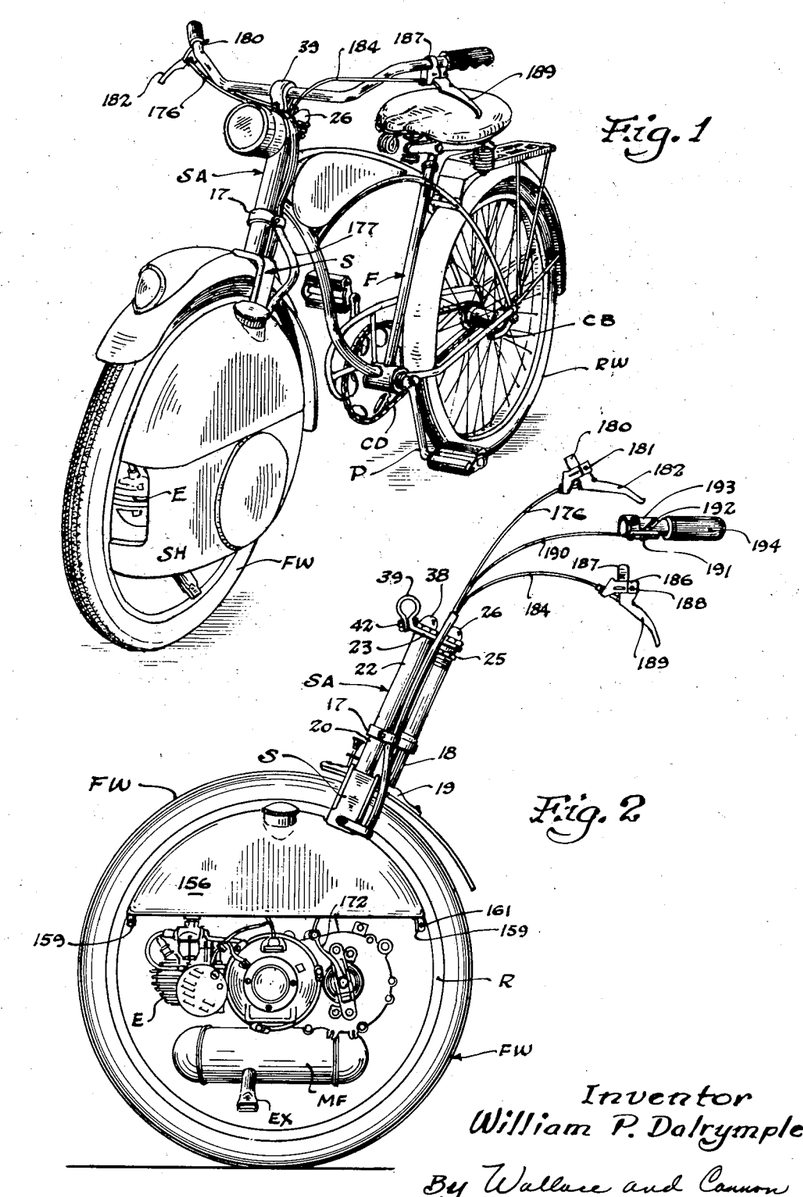
Fig. 1 is a perspective view of a bicycle embodying my invention.
Fig. 2 is a side elevational view of the apparatus constituting my invention and wherein a cover plate has been eliminated.

The powered bicycle illustrated in Fig. 1 embodying my novel invention includes a conventional frame F affording the usual support for the rear wheel RW having a chain drive CD associated therewith and which connects the usual pedal arrangement P with the rear wheel so that when the pedals are operated in a forwardly direction, as viewed in Fig. 1, driving force is supplied with the rear wheel RW. If desired, the usual coaster brake CB may be associated with the rear wheel which, as is conventional, may be operated by operating the pedals P in a rearward direction, as viewed in Fig. 1. This brake arrangement also embodies an over-run device which is effective to enable the wheel RW to operate when the pedals P and the coaster brake are not in operation.

My novel arrangement is incorporated as the front wheel FW of the bicycle, as shown in Fig. 1, and includes a support through which the wheel FW is connected to the frame F, this support also including means mounting the engine E and other elements of my novel apparatus. Hereinafter I refer to this as the center strut S.

Figure 3:
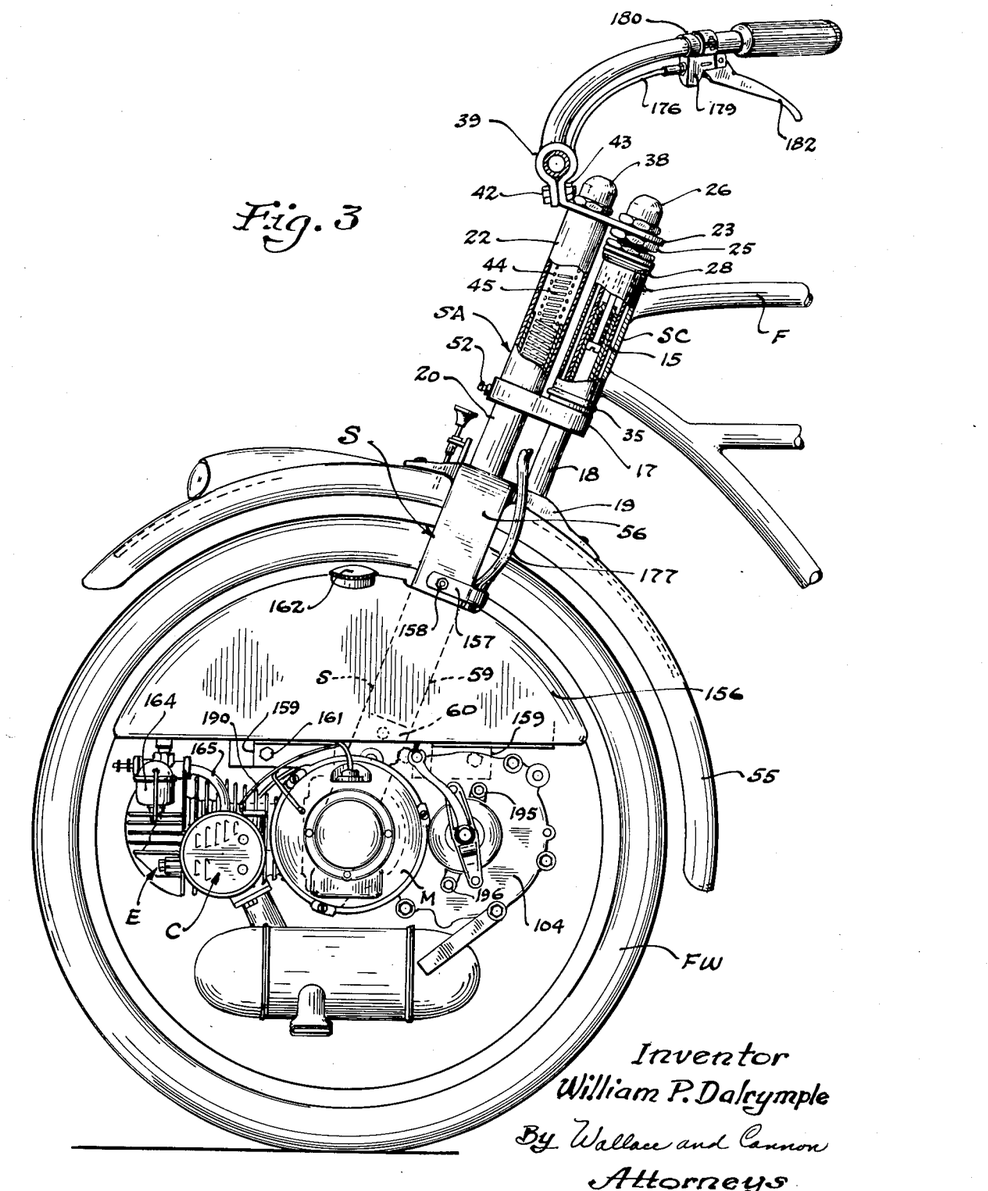
Fig. 3 is another side elevational view drawn to a larger scale than Fig. 2 and wherein certain of the elements are shown in section.
Figures 4, 5, 5A:
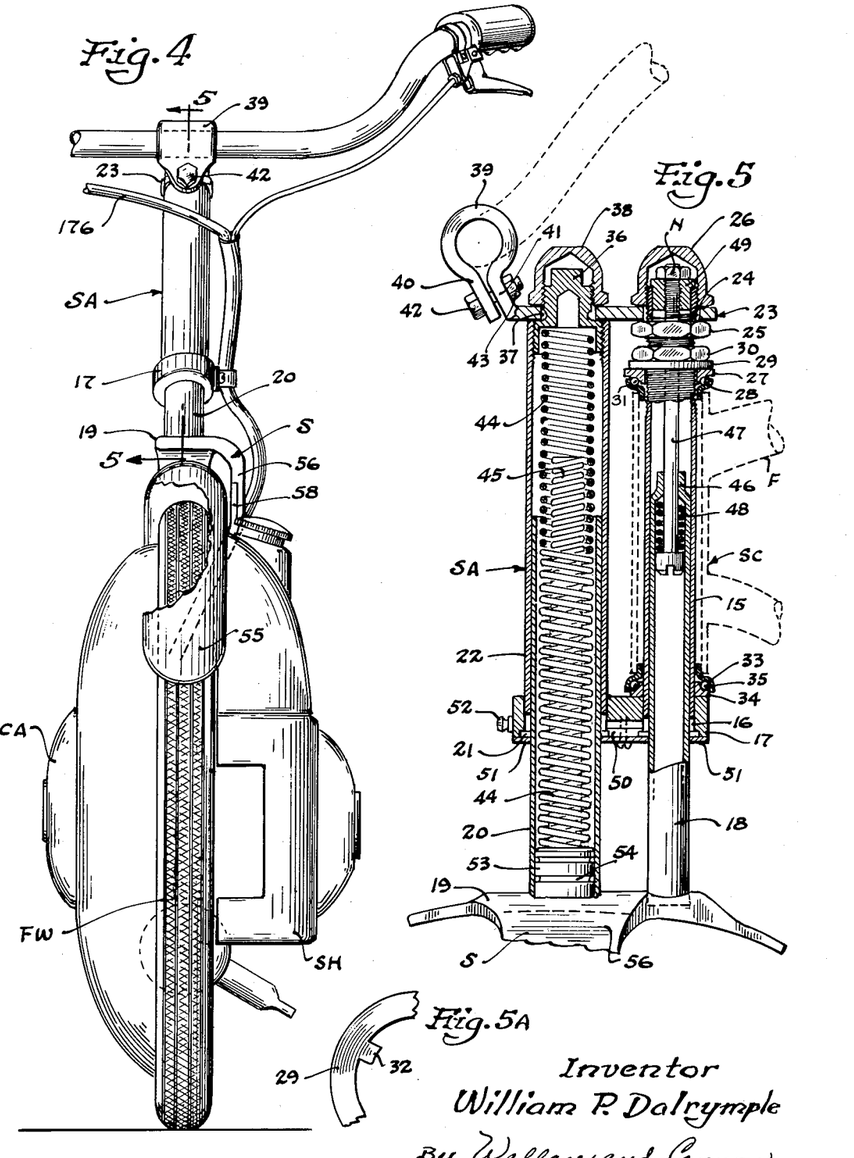
Fig. 4 is a fragmentary front elevational view of the apparatus as illustrated in Fig. 3.
Fig. 5 is a sectional detail view taken substantially on the line 5—5 on Fig. 4.
Fig. 5A is a fragmentary plan detail view of a lock washer employed in the assembly depicted in Fig. 5.

The upper end of the center strut S is connected to the frame F of the bicycle through a shock absorbing arrangement SA. Thus, a sleeve 15, Figs. 3 and 5, is mounted in the usual steering column SC at the forward end of the frame F of the bicycle. As best shown in Fig. 4, the lower end of the sleeve 15 is extended into an opening 16 in a collar 17, the sleeve being welded or otherwise suitably secured in this opening. Another sleeve 18 is mounted to have the upper end portion thereof extended into the sleeve 15 and the lower end of the sleeve 18 is welded or otherwise suitably secured to the bracket 19 provided at the upper end of the strut S. As is best shown in Fig. 5, the sleeve 18 extends through the opening 16 in the collar 17 so as to be movable relative to this collar.

Another sleeve 20 has the lower end thereof welded or otherwise suitably secured to the bracket 19 forwardly of the sleeve 18. The sleeve 20 is freeely passed through an opening 21 in the collar 17 that is located forwardly of the opening 16. The upper end of the sleeve 20 extends into a sleeve 22 which, as best shown in Fig. 5, has the lower end thereof extended into the opening 21 and this tube is welded or otherwise suitably secured to the collar 17.

The sleeve 15 is adapted to be disposed in the steering column SC for rotative movement therein and in order to insure freedom for such movement, a ball bearing arrangement is afforded on which the sleeve 15 rotates. Thus, an upper race 27 of the ball bearing structure at the top of the steeering column SC is mounted on the screw-threaded upper end portion of the sleeve 15 in an adjusted position relative to the end of the sleeve, such adjusted position being that which will relate the sleeve 15 to the steering column SC in the desired manner. In order to retain the race 27 in its adjusted position a washer 29 is engaged with the upwardly disposed face of the race 27 and it, in turn, is engaged by a locknut 30. When the locknut 30 is tightened against the washer 29 the race 27 is retained in a fixed position also so as to prevent turning movement thereof about the sleeve 15. In order to insure that the washer 29 and locknut 30 will perform this latter function, the washer is equipped with a tongue 32, Fig. 5A, that fits in a keyway (not shown).

The lower race 31 of the ball bearing structure including the race 27, has a reduced end portion that is extended into and retained in the upper end of the steering column SC. Balls 28 are interposed between the races 27 and 31 and it is this that affords the ball bearing structure at the upper end of the steering column SC.

A similar arrangement is provided at the lower end of the steering column SC where a race 33 is extended into and retained in the lower end of the steering column SC. The other race 34 of the ball bearing structure of which the race 33 is a part, rests on the upper face of the collar 17 about the sleeve 15 and balls 35 are interposed between these last-named raceways to thereby afford a ball bearing structure at the lower end of the steering column SC. It will therefore be seen that ball bearing structures are provided at the respective ends of the steering column SC and that these are so arranged as to insure free rotative movement of the sleeve 15 in the steering column.

A plate 23 is provided at the upper ends of the sleeves 15 and 22 and has an opening 24 therein through which the screw-threaded upper end portion of the sleeve 15 is extended. A locknut 25 is mounted on the screw-threaded periphery of the sleeve 15 and is disposed in a position to engage the lower face of the plate 23. A capnut 26 is mounted on the free end of the threaded portion of the sleeve 15 and is engaged with the upper face of the plate 23 so that the plate 23 is rigidly secured between the nuts 25 and 26.

The upper end of the sleeve 22 terminates against the lower face of the plate 23 and the interior of the upper end portion thereof is screw-threaded to receive a plug 36, a reduced portion of which is extended through an opening 37 in the plate 23. The portion of the plug 36 extended beyond the upper face of the plate 23 is screw-threaded to receive a capnut 38. By tightening this capnut in position, the plug 36 and sleeve 22 are fixedly secured to the plate 23.

The plate 23 affords the handle bar support bracket and by referring to Fig. 5, it will be seen that the forward end of this plate is in the form of a loop 39, which includes parallel portions 40 and 41 through which a bolt 42 is extended and which is retained in position by the nut 43. As shown in Fig. 1, the intermediate portion of the handle bar is rigidly secured in the loop 39.

The telescoped sleeves 15 and 18 and 20 and 22 are a part of the shock absorbing arrangement. Thus, a spring 44 is mounted in the sleeve 20 and the lower end thereof bears against the upper face of the bracket 19 on the strut S, the spring 44 extending entirely through the sleeves 20 and 22 so that the upper end thereof bears against the end of the inner face of the plug 36. Another spring 45 is mounted interiorly of the spring 44. The lower end of this spring also bears against the upper face of the bracket 19, but, as best shown in Fig. 5, the upper end of this spring is terminated in spaced relation with the plug 36.

As best shown in Fig. 5, the upper end of the sleeve 18 is reduced to afford a throat 46 through which a headed pin 47 is extended. A spring 48 is interposed between the head of the pin 47 and the inner end of the throat 46. The upper end of the pin 47 is threaded and is passed through a medially located opening in the plug 49 that is frictionally secured in the upper end of the tube 15. A nut N is fast on the upper end of the pin 47 and engages the top of the plug 49 so as to limit downwardly directed separating movement between the sleeves 15 and 18, the engagement of the spring 48 with the throat 46 also being effective in this regard.

Referring to Fig. 5, it will be seen that the openings 16 and 21 are in communication with one another so to thereby provide a chamber 50 formed in the lower face of the collar 17. This chamber is closed by a plate 51 that engages the lower face of the collar 17 and is bolted or otherwise suitably secured thereto. A suitable grease fitting 52 communicates with the chamber 50 so that the grease may be introduced into the chamber 50 to lubricate the sleeves 15 and 18 and 22 and 20 in the course of relative movement therebetween.

When the front wheel FW encounters a depression or elevation in the roadway being traveled, the shock incidental to such an engagement is dissipated by the arrangement SA which is best shown in Fig. 5. Thus, when an upward thrust is imparted to the strut S, this is transmitted to the sleeves 18 and 20 which therefore start to move inwardly respectively in the tubes 15 and 22. Movement of the sleeve 20 into the sleeve 22 is against the effect of the spring 44 until this spring has been sufficiently collapsed to enable the free end of the spring 45 to engage the free face of the plug 36. When this occurs, any further upward thrust is absorbed by both the springs 44 and 45.

The portion of the arrangement SA associated with tubes 15 and 18 is in effect a dashpot and when the sleeve 18 moves upwardly in the sleeve 15, the throat 46 moves upwardly along the pin 47. When, however, the tube 18 starts to move downwardly in the sleeve 15, after the effect of an upward thrust has been dissipated, air escapes slowly through the throat 48 and thereby resists movement of the sleeve 18 downwardly in the sleeve 15, the spring 48 also functioning to enhance the dashpot effect thus afforded. Hence, the arrangement SA is effective to insure smooth absorption of shocks imparted to the strut S.

The bracket 19 at the upper end of the strut S has a fixed plug 53 thereon which, as best shown in Fig. 5, is extended into the lower end of the sleeve 20 so as to firmly interconnect the strut S and arrangement SA. It is essential that the sleeve 20 and the plug 53 be securely fastened together and to this end, grooves as 54 are formed in the periphery of the plug 53. When the plug 53 is to be assembled into the sleeve 20, strips of brass, copper or similar material are disposed in the grooves 54 and once the plug 50 is properly disposed in the sleeve 20 then this end portion of the sleeve is heated to a temperature above melting point of the material introduced into the grooves 54 and thereby the plug 53 is brazed to the sleeve 20 when the parts are permitted to cool after such heating thereof.

The bracket 19 and its plug 53 are afforded by forging and by referring to Fig. 3, it will be seen that the lower face of this forging is of arcuate configuration so as to conform to the configuration of the fender 55 for the front wheel FW. Since, as will be explained presently, the wheel FW is carried by the strut and since the fender 55 is also carried by the strut, these two parts are maintained in predeterrmnied spaced apart relation.

Figures 8, 9, 10, 11:
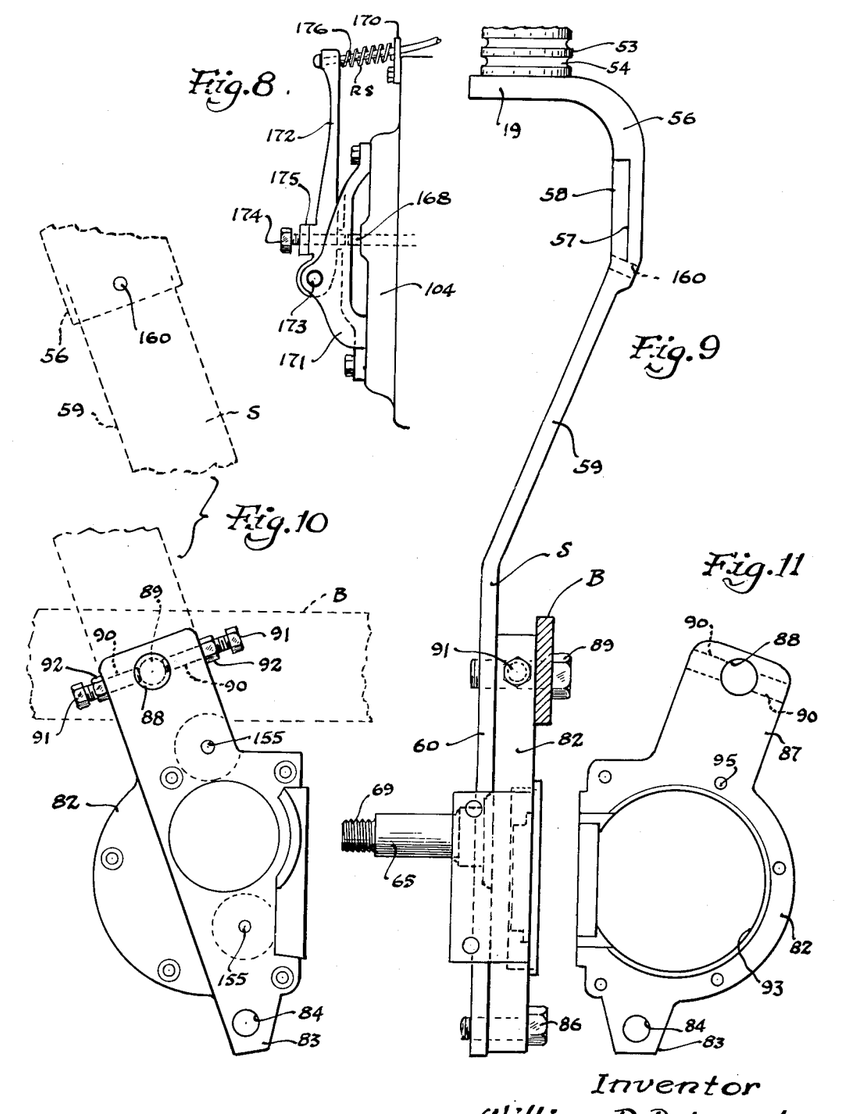
Fig. 8 is a detail view taken substantially on the line 8—8 on Fig. 6.
Fig. 9 is a front elevational view illustrating the strut that constitutes the support element of my novel apparatus.
Fig. 10 is a fragmentary elevational view of the strut shown in Fig. 9.
Fig. 11 is a detail view of an adjustable support plate employed in the apparatus illustrated in Figs. 9 and 10.

As best shown in Figs. 3, 4 and 9, the bracket 19 includes a depending arm 56 which extends downwardly at an acute angle with reference to the vertical, Fig. 3, while the main body of the bracket 19 is arranged at an acute angle with refernce to the horizontal. The depending arm 56 is offset to one side of the plane in which the aligned sleeves 20 and 18 are disposed.

A recess 57, Fig. 9, formed in the inwardly disposed face of the depending arm 56, is adapted to receive a pad 58 disposed at the upper end of the strut S. By referring to Fig. 9 it will be seen that the lower end portion 60 of the strut S is disposed to be substantially in vertical alignment with body portion of the bracket 19. The disposition of this portion 60 of the strut S relative to the bracket is such that when the wheel FW is mounted on an axle carried by portion 60, the vertical center line of the tread of the wheel is disposed in the vertical center plane of the plug 53 and, therefore, of the steering column SC, the curvature of the disc D of the wheel FW being such as to insure this. An inclined portion 59 of the strut S connects portion 60 thereof with the pad 58. It will be noted that the strut S is both relatively thick and wide so as to insure against springing or other distortion when the wheel FW is subjected to impact.

As best shown in Figs. 2 and 5, the steering column SC is inclined forwardly with respect to the frame F so that the lower end of the column is ahead of the upper end thereof. Again referring to Figs. 3 and 9, it will be noted that the arm 56, pad 58, intermediate portion 59 and vertical portion 60 of the strut S are inclined forwardly to lie in a plane that is in parallel relation with the center plane of the forwardly disposed steering column SC. In this way the proper rake is afforded and the center line of the axle on which the wheel FW rotates is disposed forwardly of the front end of the frame F of the bicycle.

Figure 7:
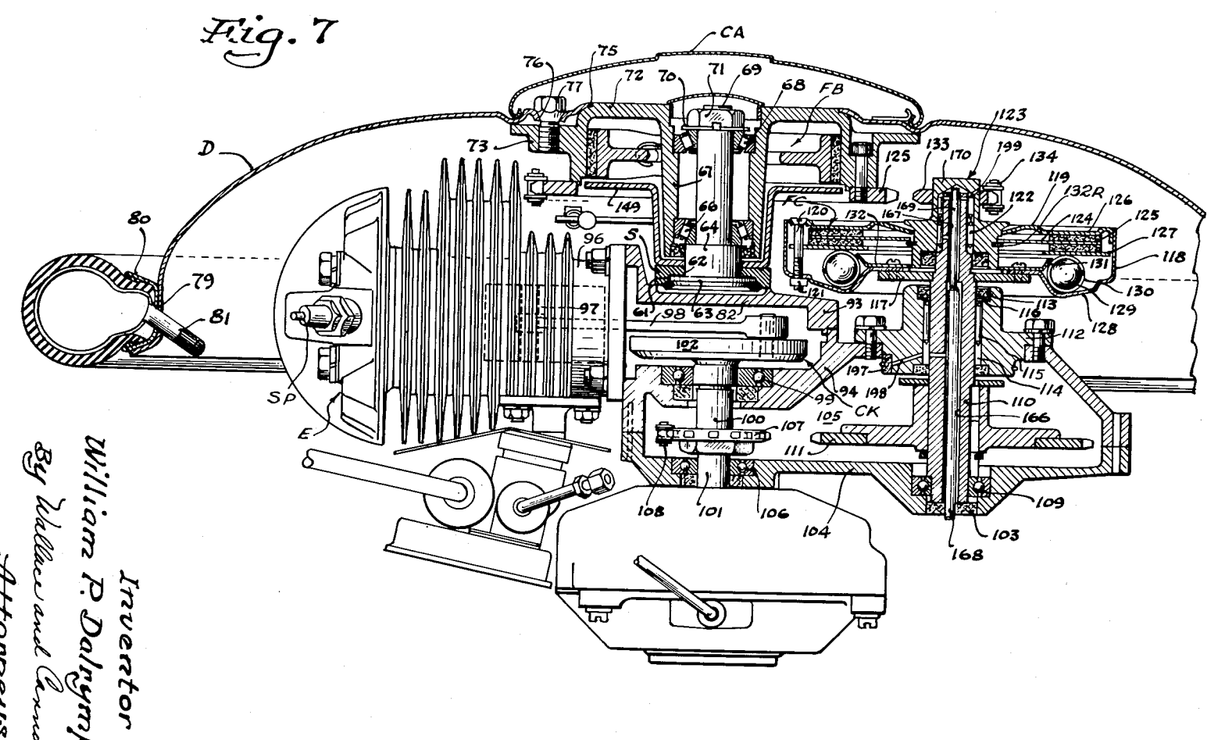
Fig. 7 is a horizontal sectional detail view taken substantially on the line 7—7 on Fig. 6.
Figure 12:
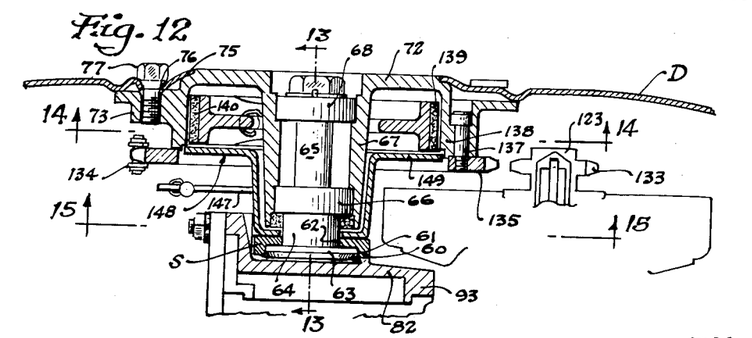
Fig. 12 is a horizontal sectional view of the brake mechanism and showing elements depicted in Fig. 7, Fig. 12 being drawn to a larger scale than Fig. 7.
Figure 13:
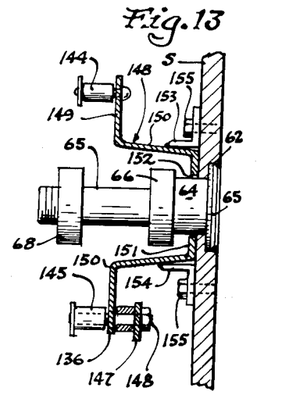
Fig. 13 is a fragmentary vertical sectional view taken substantially on the line 13—13 on Fig. 12.
Figure 14:
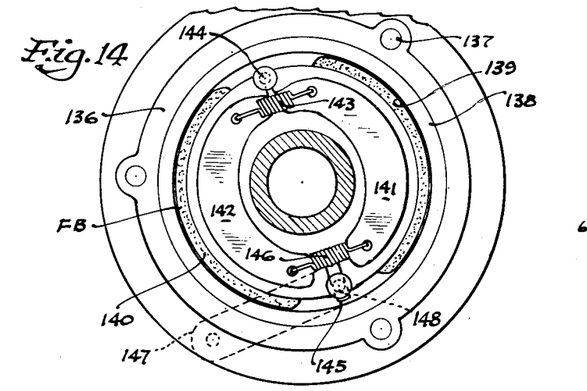
Figs. 14 and 15 are sectional detail views taken substantially and respectively on lines 14—14 and 15—15 on Fig. 12.

A recess 61, Figs. 7 and 12, is formed in one face of the vertically extended portion 60 of the strut S. An opening 62 extends through the strut S from the inner end of the recess 61 to the opposite face of the vertically extended portion 60. An axle 65 includes a circular base portion 63 that is disposed in the recess 61 and which is desirably welded or otherwise secured in such recess. The axle includes a reduced circular portion 64 that is disposed in the opening 62 and main extent of the axle member 65 projects outwardly from the face of the vertical portion 60 opposite that in which the recess 61 is formed.

A roller bearing 66, Figs. 7 and 12, is disposed about the axle 65 and abuts the end of the reduced portion 64. The hub 67 for the wheel FW includes the shoulder of the inner end portion that embraces the outer race of the roller bearing 66, the opposite end of the hub 67 also being shouldered and arranged to embrace the outer race of a roller bearing 68. A reduced portion 69, Fig. 7, is provided at the free end of the axle 65 and a washer 70 is disposed in position to engage the outwardly disposed face of the bearing 68. A nut 71 is mounted on its screw-threaded periphery of the reduced portion 69 and engages the washer 70 and, when tightened, is effective to hold the hub 67 in position for rotation about shaft 65 and the roller bearings 66 and 68.

The hub 67 is a part of the brake housing 72 which is circular in outline and which has a ring 73 provided on the periphery thereof. The dished disc D of the wheel FW has a centrally located opening therein which seats on a shoulder 75 provided on the housing 72 outwardly of the outwardly disposed face of the ring 73. Openings as 76 are formed in the disc D in spaced relation with the centrally located opening in this disc and bolts as 77 extend through these openings and into tapped openings in the ring 73 to thereby be effective to secure the disc to the housing 72 and ring 73. Inasmuch as the housing 72 is a part of the hub 67, it will be seen that the disc D of the front wheel FW is supported for free rotation about the axle 65.

In the present instance the outer marginal portion of the disc D is formed to afford a flange 79, Fig. 7. A standard bicycle tire rim 80 is secured to the flange 79 as by being welded thereto. The customary tire is mounted on the rim 80 in a conventional manner and is equipped with the usual air valve 81, Fig. 7.

The engine E which supplies power to the wheel FW is also mounted on the vertically extended portion 60 at the lower end of the strut S. To this end the wall 82 of the crankcase CK of the engine is mounted on the face of the vertically extended portion 60 into which the recess 61, Fig. 7, opens. The wall 82 includes an arm 83, Fig. 11, having an opening 84 formed therein that is adapted to embrace the body of a bolt 86 that is threaded into a tapped opening at the lower end of the vertically extended portion 60 of the strut S, this bolt being effective to retain the wall 82 and the vertical portion 60 in face-to-face engagement.

As will be explained hereinafter, it is advantageous to so mount the wall 82 that it, and, therefore, the engine E and associated parts, may be moved relative to the strut S across the adjacent face of the vertical portion 60 thereof. To this end the wall 82 includes an arm 87 that is arranged in diametrical relation with the arm 83. The arm 87 has an opening 88 formed therein midway between the side edges thereof and the body of a bolt 89 is passed through this opening and fitted into a tapped opening in the portion 60 of the strut S. The diameter of the bolt 89 is smaller than the opening 88 so that, therefore when the bolts 86 and 89 are loosened, it is possible to move the wall 82 over the adjacent face of the vertical portion 60 in the amount permitted by the clearance between opening 88 and bolt 89. In order to retain the wall 82 and its arm 87 in predetermined positions, tapped openings as 90 extend into the arm 87 from opposite edges thereof. Adjusting screws as 91, are mounted in the tapped openings 90 and have locknuts 92 associated therewith. The ends of the adjusting screws are positioned to engage the opposite sides of the bolt 89 and when so engaged, the locknuts 92 are tightened to thereby hold the screws in their set positions and this disposes the wall 82 and associated parts in a predetermined position. When it is desired to shift the wall 82 relative to the vertical portion 60, the locknuts 92 are loosened and the screws 91 are then adjusted to cause the arm 87 to move relative to the bolt 89. This arrangement is utilized for the purpose of maintaining a chain taut, as will be described presently.

The wall 82 is one side wall of the crankcase CK of the engine E and on the inwardly disposed face of this wall a circular flange 93, Figs. 7 and 12, is provided against which a shoulder on the other side wall 94 of the crankcase of the engine is adapted to seat. The circular configuration of the walls 82 and 94 is interrupted to afford a seat to which the lower end of the cylinder wall 96 of the engine E is connected and thereby the crankcase CK is closed.

The usual piston 97, Fig. 7, is mounted for reciprocation in the cylinder 96 and has a connecting rod 98 connected thereto in the conventional manner. The side wall 94 of the crankcase has a bearing 99 mounted therein in which the crankshaft 100 of the engine E is mounted. At its inner end the crankshaft carries a disc 102 to which the connecting rod 98 is eccentrically connected so that in the course of reciprocation of the connecting rod a rotary movement is imparted to the disc 102 and crankshaft 100.

Another housing wall 104, Fig. 7, is secured to the side wall 94 outwardly thereof and therewith affords a chamber 105 in which certain driving elements of my novel apparatus are included. Thus, a bearing 106 is mounted in the wall 104 and an extension 101 of the crankshaft 100 journaled in this bearing. This portion of the crankshaft extends into the housing of the magneto M to drive the same when the crankshaft is set in rotation.

A sprocket 107 is fast on the crankshaft 100 inwardly of the bearing 106 and a chain 108 passed about this sprocket. Another bearing 109 is provided in the housing 104 in spaced relation with the bearing 106 and one end of a shaft 110 journaled in this bearing 109. A sprocket 111 is mounted on the shaft 110 and the chain 108 is passed about this sprocket so that when rotative movement is imparted to the crankshaft 100 and the sprocket 107 thereon, this movement is transmitted to the chain 108 to the sprocket 111 and shaft 110. A seal 103 is provided outwardly of the bearing 109 and the adjacent end of the shaft 110.

A cap 112 closes an opening in the housing 104 that is located opposite to the bearing 109. This cap has a bearing opening 114 formed therein in which a needle bearing 115 is mounted, the medial part of the shaft 110 being journaled in this bearing. Packing 116 is mounted in recess 113 in the cap 112. Outwardly of this packing, the diameter of the shaft 110 is slightly reduced and a plate 117 is secured to this portion of the shaft. A plate 117 affords a support for clutch housing 118 which includes an open side that is closed by the cover 119. As best shown in Fig. 7, bolts as 120 are passed through the cover 119 and the clutch housing 118 and nuts 121 are mounted on these bolts outwardly of the clutch housing 118. Thus, the cover 119 is connected to the clutch housing 118 for rotation therewith and it is free to move axially with respect to housing within limits permitted by the adjustment of the nuts 121 on the bolts 120.

The shaft 110 is further reduced in diameter outwardly of the plate 117 and a needle bearing 122 is disposed about the reduced end portion of the shaft and a hub 123 is mounted on this roller bearing. The hub 123 includes a polygonal portion on which a friction disc 124 is mounted so as to rotate the hub while being slidable axially along the polygonal portion of the hub. The friction disc 124 has friction facings 125 on opposite faces at the periphery thereof. One of these friction facings is faced toward a clutch face 126 afforded on the cover 119. A pressure plate 127 is provided which is disposed for free rotation about the hub 123 and is positioned to be engaged by the other of the friction facings. A ramp 128 is formed in the clutch housing 118 and a plurality of balls 129 mounted in a garter spring 130 are mounted between this ramp and the pressure plate 127. The spring 130 is effective to urge the balls 129 inwardly into engagement with the lower end of the ramp 128 and into engagement with a flange 131 on a plate 132 carried by the plate 117. The clutch which has just been described is like that disclosed in the copending application filed by me jointly with Burr W. Mantle and Henry A. Sherwood, Serial No. 183,178, filed September 5, 1950.

When the engine is set in operation, rotative movement is transmitted by the chain 108 to the sprocket 111 and thence to the shaft 110. The clutch housing 118 and a cover plate 119 are then set in rotation and, under the effect the centrifugal force attendant to such rotation, the balls 129 are urged outwardly along the ramp 128 whereby pressure exerted upon a pressure plate 127 to thereby engage it with the adjacent friction facing 125, the other friction facing being urged at this time into engagement with the clutch face 126 on the cover 119. This engages the clutch and connects the hub 123 to the shaft 110 for rotation therewith. A retaining ring 132R is mounted on the hub 123 inwardly of the friction disc 124 and is effective to limit outward movement of the hub along the shaft 110. This ring serves an additional function, as will be described hereinafter.

A sprocket 133 is fast on the hub 123 thereof and a chain 134 is passed thereabout, said chain also passing about a sprocket 125 that is connected to one wall of the brake housing 72. Thus, rotative movement imparted to the shaft 110 is transmitted to the brake housing and from thence through the disc D to set the wheel FW in operation.

The brake housing 72, as explained hereinabove, is rotatable about the axle 65 on the roller bearings 66 and 68. The sprocket 125 is secured to the brake housing by bolts as 137, Fig. 12. The brake housing includes a brake drum 138 against which friction members 139 and 140 are adapted to bear to effect deceleration of the front wheel FW. The friction elements 139 and 140 are respectively mounted on brake shoes 141 and 142 which at corresponding ends thereof have rounded portions that are adapted to embrace the pin 144 to be rotatable thereabout. These ends of the brake shoes are held in engagement with the pin 144 under the influence of a spring 143. Another spring 146 extends between the brake shoes at the opposite ends and urges the same into engagement with a cam 145 carried by a shaft mounted on the flange portion 149 of torque plate 148. A lever 147 is secured to this shaft outwardly of the torque plate 148 and this lever is connected to means which are effective to rock the shaft and thereby turn the cam 145 so as to thereby force the friction members 139 and 140 into engagement with the brake drum. The annular flange portion 149 of the torque plate closes the inwardly disposed face of the brake housing 72, the pin 144 and the shaft carrying the cam 145 being mounted in this portion of the torque plate. The medial part of the torque plate is dished to form a collar 150 which is disposed around the axle 65. The end wall 151 at the outer end of the collar 150 has an opening 152 therein through which the axle 65 is extended. Two L-shaped brackets 153 and 154 are welded to the collar 150 at diametrically disposed positions and the base portions of these L-shaped brackets are seated against faces on the vertical portions 60 of the strut S, bolts as 155 passing through these foot portions to connect the brackets 153 and 154 and therefore the collar 150 and torque plate 136 to the strut S. Thus, it will be seen that the forces incidental to deceleration are dissipated through the torque plate 148 to the rigid strut S.

Fuel for the engine E is supplied from a tank 156 that has a clip 157, Fig. 1, along the top edge thereof that is disposed in engagement with the lower end of the depending arm 56 of the bracket 19, a bolt 158 being fitted into a tapped hole 160, Fig. 10, in the depending arm 56 to secure a clip 157 and therefore the upper end of the gas tank 156 to the strut S. Clips 159 are welded or otherwise suitably secured to the bottom wall of the tank 156 and these clips are disposed in engagement with a bar B, Figs. 9 and 10, which is fast to the portion 60 of the strut S by the same means that are effective to connect the arm 87 of the wall 82 to this strut. Suitable bolts as 161 pass through the clips 159 to secure the same to the strap 160. The gas tank 156 includes the usual filling arrangement 162.

Figure 6:
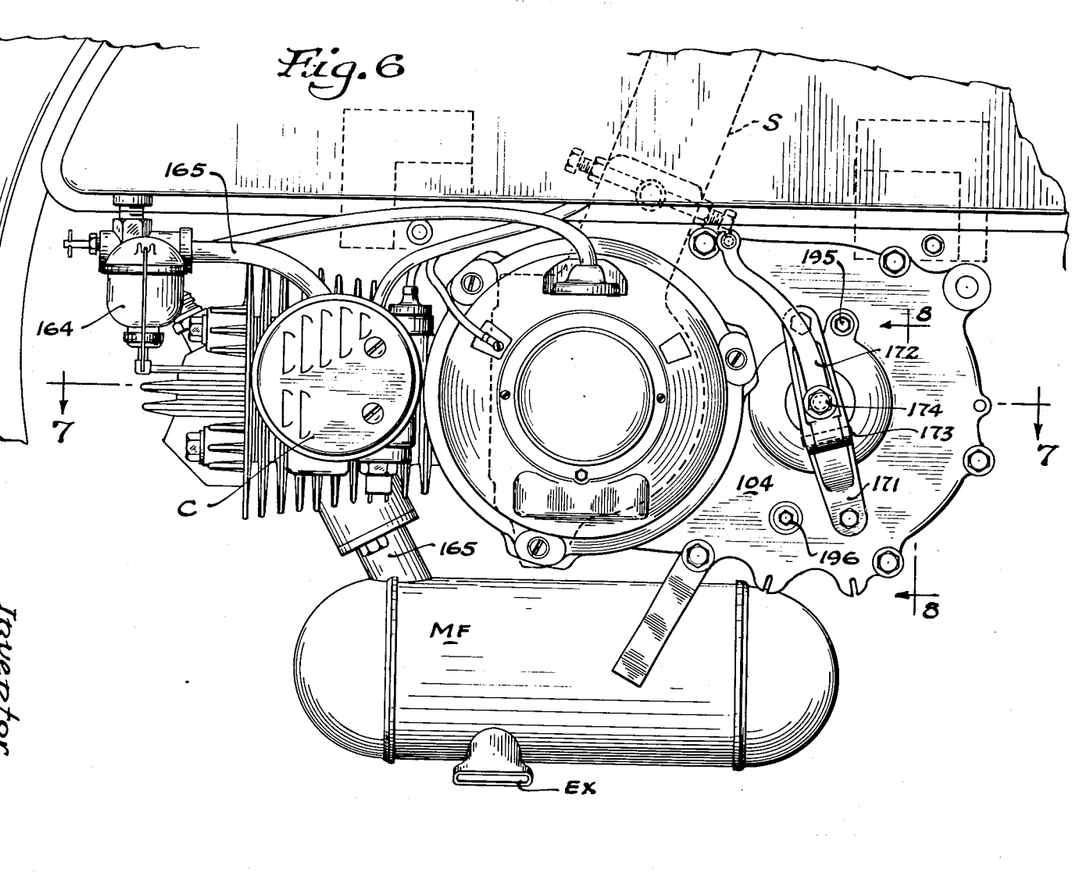
Fig. 6 is a fragmentary side elevational view showing the engine and related parts as these are shown in Fig. 3, Fig. 6 being drawn to a larger scale than Fig. 3.

Fuel introduced into the tank 156 flows therefrom through the fuel line to a sediment bowl arrangement 164, Figs. 2 and 6, where sediment and the like collects so as to prevent passage thereof to the carburetor C, the fresh air intake of which is illustrated in Figs. 2 and 6, the fuel flowing from the sediment bowl 164 through the fuel line 165 to the carburetor C. The carburetor C in the present instance is mounted directly on the engine E in such a way that the outlet of the carburetor C is connected to the fuel intake of the engine.

When the engine E is to be set in operation, it is advantageous to bring this about by operating the bicycle through the intermediary of the pedals P. Under such circumstances, since the bicycle will be moving at a relatively slow rate, the balls 129 will not move up the ramp 128 to effect engagement of the clutch. Therefore, an arrangement is provided whereby manual engagement of the clutch may be effected during the starting operation, this arrangement also being disclosed in the aforesaid copending application.

Thus, by referring to Fig. 7, it will be seen that an axial bore 166 extends through the portion of the shaft 110 of greatest diameter and in the portion of the shaft 110 of smaller diameter another axial bore 167 is provided. A pin 168 is mounted in the bore 166 and the inner end of this pin engages a pin 169 in the bore 167. When the pin 168 is forced inwardly, this movement is transmitted through the pin 169 to the closed end 170 of the hub 123 which thereupon shifts outwardly along the portion of the shaft 110 on which it is mounted. This brings the retainer ring 132R into engagement with the friction plate 124 which is thereupon urged toward the cover 119 of the clutch so as to bring the friction facing 125 disposed intermediate the friction plate 124 and the clutch face 126 into tight engagement with such face so as to thereby engage the clutch and connect the hub 123 to the shaft 110 for conjoint operation.

Thus, when the bicycle is propelled forwardly by operation of the pedals P, the clutch is caused to engage by manual manipulation through an arrangement to be described presently. When the wheel FW is in rotation in this manner the sprocket 135 secured to the brake housing 67 is set in rotation and this is effective through the chain 134 to transmit motion to the pinion 133 on the hub 123 since at this time the hub will be connected to the shaft 110. This rotary motion is transmitted from the shaft 110 to the sprocket 111 and thence through the chain 108 to the sprocket 107 on the crankshaft 100 of the engine E. Since the magneto M is operated from the crankshaft 100 it is also set in operation at this time. As the crankshaft 100 rotates, reciprocatory movement is imparted through the connecting rod 96 to the piston 97 in the cylinder of the engine E. The engine E is preferably a two-cycle engine and on the downward stroke of the piston fuel will be withdrawn from the carburetor C to cylinder of the engine so that when this fuel is compressed on the up stroke of the piston, energy from the magneto M will be supplied to the spark plug SP which will therefore ignite the compressed fuel and thereupon the engine E is set in operation. The exhaust line 165 from the engine E leads to muffler MF having exhaust outlet EX.

When the engine E has been set in operation in the manner described, it will ordinarily propel the bicycle forward more rapidly than this can be effected by operation of the pedals P. Such operation of the engine E will be effective to drive the shaft 110 at a speed sufficient to cause the balls 129 to move along the ramp 128 and thereby effect engagement of the clutch. When this occurs the manually operable means effective to bring about manual engagement of the clutch may be released and operation will continue until the engine E is stopped.

Manual engagement of the clutch FC is brought about by inward movement of the pin 168 effected through the intermediary of the devices illustrated in Figs. 2, 6 and 8. Such devices include a bracket 171 on which a rocker 172 is pivotally mounted as indicated at 173. The rocker 172 carries an adjusting screw 174 having a locknut 175 associated therewith. The inner end of the adjusting screw 174 is disposed for engagement with the outer end of the pin 168 so that movement of the rocker 172 in a clockwise direction, as viewed in Fig. 8, is effective through the screw 174 on the pin 168 to move the same in such a manner as to bring about engagement of the clutch, as described hereinabove.

Rocking movement is imparted to the lever 172 through a Bowden cable 176. This cable 176 leads from the rocker 172 to bracket 170, Fig. 8, and thence to the lower end of a rubber tube 177 through which this cable and other controls are extended. Thus, by referring to Fig. 2, it will be seen that the tube 177 is connected to the collar 17 by a clip. The tube 177 extends upwardly past the plate 23 and the cable 176 is continued beyond the upper end of the tube 177, as shown in Fig. 2. The upper end of the cable 176 is connected to a rocker 179. The rocker 179 is pivotally mounted on a clamp band 180 that surrounds the right-hand portion of the handlebar 49, the rocker 179 being pivotally mounted on the clamp band 180, as indicated at 181. A grip portion 182 is provided on the rocker and when the friction clutch FC is to be manually engaged, this portion 182 is manually gripped and moved toward the handlebar 49. Such movement moves the rocker 179 and is effective through the cable 176 to move the rocker 172 toward the right, as viewed in Fig. 8, to thereupon enable the adjusting screw 174 to be effective on the pin 168 as described hereinabove. When the grip 182 is released, the return spring RS, Fig. 8, extended about the Bowden cable 176 between the bracket 170 and the rocker 172 is effective to restore the Bowden cable and parts associated therewith to the ineffective positions thereof.

Figure 15:
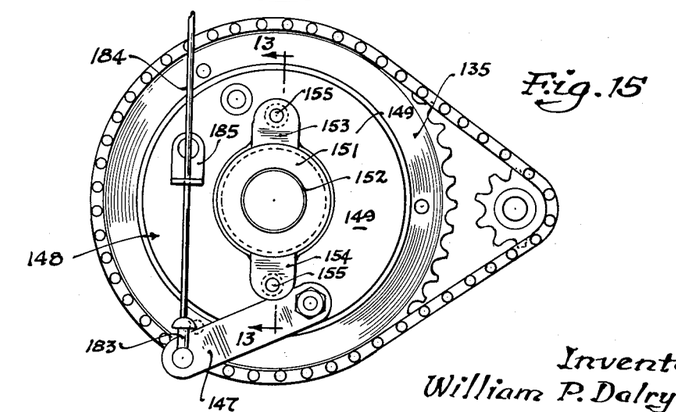

A manually operative arrangement is also provided for the friction brake FB. This arrangement includes the rocker 147, Fig. 15, which has a clevis 183 mounted at the free end thereof, the inner end of the rocker 147 being connected to the shaft 148 that carries the brake operating cam 145. A Bowden cable 184 is connected to the clevis 183 and extends upwardly through a guide clip 185, Fig. 15, mounted on the outer face of the torque plate 148. This cable 184, like the cable 176, leads to the lower end of the rubber tube 177 and through this tube and is extended beyond the upper end of the tube, as illustrated in Fig. 2. The cable 184 is connected to a rocker 186 that is mounted on a clamp band 187 that embraces the left-hand portion of the handlebar and which is securely clamped thereto, the rocker 186 being pivotally mounted on the clamp band 187, as indicated at 188. The rocker includes a finger grip portion 189 which, when grasped and moved toward the handlebar, is effective to so move the cable 184 that it is effective to move the rocker 147, and this is effective to rotate the shaft 148 and the cam 145 in such a way that the lobes of the cam cooperate with the adjacent end of the shoes 141 and 142 to bring the friction members 139 and 140 into frictional engagement with the brake drum 138 whereby the vehicle is decelerated.

In order to control the speed of operation of the engine E a Bowden cable 190 leads from the throttle valve (not shown) of the engine E into the lower end of the tube 177 and this cable 190 is extended upwardly and beyond the upper end of the tube 177. The free end of the cable 190 is connected to a cam follower 191 that is adapted to travel in the cam groove 192 afforded on the sleeve 193 that is mounted for rotation about the right-hand portion of the handlebar. The sleeve 193 includes a grip portion 194 which, when grasped and rotated about the portion of the handlebar on which it is mounted, is effective to move the follower 191 through the cam groove 192 so that longitudinal movement is imparted to the cable 190 and this longitudinal movement is effective to adjust the throttle valve of the engine E so that the engine will operate at the speed desired.

It has been explained hereinabove that the wall 82 of the housing of the crankcase CK may be moved relative to strut S as by loosening the locknuts 92 and adjusting the screws 91 relative to the bolt 89. The adjustment that may be so effected is utilized to maintain taut chain 134. The sprocket 135 about which this chain is passed is retained in fixed position about the axle 65 by reason of the mounting thereof of the brake housing 72. However, the sprocket 133 about which the chain 124 also passes is mounted so that it may be moved relative to sprocket 125 when the aforesaid adjustment is effected. Thus, the sprocket 133 is mounted in the hub 123 that is carried by the shaft 110 which is supported in bearings provided in wall 104 and the cap 112. It has been explained hereinabove that the wall 104 is connected to the wall 94 of the crankcase CK. Hence, in effect, sprocket 133 is carried by crankcase CK and hence adjustment of the position of the crankcase CK on the strut S moves the sprocket 133 relative to sprocket 125 and this, as stated, is utilized to maintain taut chain 134.

Lubricant is introduced into the crankcase CK through a suitable opening (not shown) provided for that purpose and this lubricant is effective to lubricate the crankshaft 100 and associated parts.

Lubricant is also to be introduced into the chamber 105 and such lubricant is introduced into this chamber by removing a plug 195, Figs. 3 and 6, from the opening in the wall 104 in which it is mounted. At this time plug 196, Figs. 3 and 6, is removed from the opening in which it is mounted. Lubricant is introduced into the chamber 105 through the opening disclosed by the removal of the plug 195 until lubricant flows out of the opening disclosed by removal of the plug 196 and in this way it is insured that an excess quantity of lubricant is not introduced into the chamber 105. Inasmuch as sprocket 107, chain 108 and sprocket 111 are mounted in the chamber 105 they will be supplied with lubricant from this chamber. Moreover, in the course of operation of sprocket 111 and the chain 110, oil from the chamber 105 flows onto the pad 197, Fig. 7. This pad and the passage 198 leading therefrom are part of a lubricating system which is in the nature of that disclosed in the aforesaid copending application filed by me jointly with Burr W. Mantle and Henry A. Sherwood. The lubricant which flows through this system is discharged through the passage 199, Fig. 7, adjacent to the sprocket 133 and lubricant which flows through this passage onto this sprocket is effective to lubricate same and also the chain 134 and the sprocket 125. Hence, even though the chain 134 and its associated sprockets are not enclosed in a housing, proper lubrication thereof is nevertheless insured.

In order to enhance the appearance of my novel power unit or powered wheel a shroud SH is secured beneath the gas tank 156, this shroud being removably retained in this position and including a cap CP which may be removed separately if and when necessary. A cap CA covers the central opening in the dished wheel and this cap is clamped in position in the manner shown in Fig. 7.

Herein I have described my novel power unit arranged to constitute the front wheel of a bicycle. It will, of course, be appreciated that it can be similarly used in a tricycle. Furthermore, there are instances where my power unit may be advantageously employed as a driving wheel for a vehicle in a position other than as the front or steering wheel thereof.

It will be manifest from the foregoing description that my novel arrangement enables the hereinabove set forth and kindred objects of this invention to be realized. Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a mounting structure for steerably mounting a front wheel and drive motor therefor in the steering column of a bicycle or the like, a downwardly extending rigid strut upon the lower end portions of which a wheel and a drive motor are adapted to be mounted, a bracket at the upper end of said strut in rigid relation thereto, front and rear inner sleeves rigidly fixed to and projecting upwardly in parallel spaced relation from said bracket, front and rear outer sleeves slidably surrounding upper portions of said front and rear inner sleeves respectively, a lower connecting bar rigidly fixed to the lower ends of said front and rear outer sleeves, an upper connecting bar embodying a handlebar mount and releasably connected to the upper ends of said front and rear outer sleeves, upper and lower ball bearings mounted on said rear outer sleeve and adapted to engage the upper and lower ends of a steering column to afford an anti-friction bearing mounting of said rear outer sleeve with respect to such a steering column, means on said rear outer sleeve for securing said upper ball bearing a vertical position corresponding to the vertical dimension of such a steering column, compression spring means within said front sleeves to resist upward displacement of said inner sleeves relative to said outer sleeves, and means within said rear inner and outer sleeves for limiting downward movement of said inner sleeves relative to said outer sleeves.

2. In a mounting structure for steerably mounting a front wheel and drive motor therefor in the steering column of a bicycle or the like, a downwardly extending rigid strut upon the lower end portions of which a wheel and a drive motor are adapted to be mounted, a bracket at the upper end of said strut in rigid relation thereto, front and rear inner sleeves rigidly fixed to and projecting upwardly in parallel spaced relation from said bracket, front and rear outer sleeves slidably surrounding upper portions of said front and rear inner sleeves respectively, a lower connecting bar rigidly fixed to the lower ends of said front and rear outer sleeves, an upper connecting bar embodying a handlebar mount and releasably connected to the upper ends of said front and rear outer sleeves, upper and lower ball bearings mounted on said rear outer sleeve and adapted to engage the upper and lower ends of a steering column to afford an anti-friction bearing mounting of said rear outer sleeve with respect to such a steering column, means on said rear outer sleeve for securing said upper ball bearing a vertical position corresponding to the vertical dimension of such a steering column, compression spring means within said front sleeves to resist upward displacement of said inner sleeves relative to said outer sleeves, and means including a resilient member within said rear inner and outer sleeves for resiliently limiting downward movement of said inner sleeves relative to said outer sleeves.

3. In a mounting structure for steerably mounting a front wheel and drive motor therefor in the steering column of a bicycle or the like, a downwardly extending rigid strut upon the lower end portions of which a wheel and a drive motor are adapted to be mounted, a bracket at the upper end of said strut in rigid relation thereto, front and rear inner sleeves rigidly fixed to and projecting upwardly in parallel spaced relation from said bracket, front and rear outer sleeves slidably surrounding upper portions of said front and rear inner sleeves respectively, a lower connecting bar rigidly fixed to the lower ends of said front and rear outer sleeves, an upper connecting bar embodying a handlebar mount and releasably connected to the upper ends of said front and rear outer sleeves, bearing means mounted on said rear outer sleeve and adapted to engage the upper and lower ends of a steering column to afford a rotative mounting of said rear outer sleeve with respect to such a steering column, compression spring means within said front sleeves to resist upward displacement of said inner sleeves relative to said outer sleeves, and means acting between certain of said sleeves for limiting downward movement of said inner sleeves relative to said outer sleeves.

4. In a mounting structure for steerably mounting a front wheel and drive motor therefor in the steering column of a bicycle or the like, a downwardly extending rigid strut upon the lower end portions of which a wheel and a drive motor are adapted to be mounted, a bracket at the upper end of said strut in rigid relation thereto, front and rear inner sleeves rigidly fixed to and projecting upwardly in parallel spaced relation from said bracket, front and rear outer sleeves slidably surrounding upper portions of said front and rear inner sleeves respectively, a lower connecting bar rigidly fixed to the lower ends of said front and rear outer sleeves, an upper connecting bar embodying a handlebar mount and releasably connected to the upper ends of said front and rear outer sleeves, upper and lower ball bearings mounted on said rear outer sleeve and adapted to engage the upper and lower ends of a steering column to afford an anti-friction bearing mounting of said rear outer sleeve with respect to such a steering column, means on said rear outer sleeve for securing said upper ball bearing a vertical position corresponding to the vertical dimension of such a steering column, compression spring means within said front sleeves to resist upward displacement of said inner sleeves relative to said outer sleeves, and dashpot means within said rear inner and outer sleeves acting to limit the rate and extent of downward movement of said inner sleeves relative to said outer sleeves.

5. In a mounting structure for steerably mounting a front wheel and drive motor therefor in the steering column of a bicycle or the like, a downwardly extending rigid strut upon the lower end portions of which a wheel and a drive motor are adapted to be mounted, a bracket at the upper end of said strut in rigid relation thereto, front and rear inner sleeves rigidly fixed to and projecting upwardly in parallel spaced relation from said bracket, front and rear outer sleeves telescopically surrounding upper portions of said front and rear inner sleeves respectively, a lower connecting bar rigidly fixed to the lower ends of said front and rear outer sleeves, an upper connecting bar embodying a handlebar mount and releasably connected to the upper ends of said front and rear outer sleeves, means mounted on said rear outer sleeve and adapted to engage a steering column to afford a rotative mounting of said rear outer sleeve with respect to such a steering column, compression spring means within one pair of telescopical sleeves to resist upward displacement of said inner sleeves relative to said outer sleeves, means within the other pair of telescopical sleeves for limiting downward movement of said inner sleeves relative to said outer sleeves.

6. In a mounting structure for steerably mounting a front wheel and a drive motor therefor in the steering column of a bicycle or the like, an elongated upwardly extending steering head adapted for mounting in the steering column of a bicycle or the like for steering movement about a predetermined axis defined by said steering head, a bracket rigid with the lower end of said steering head and having an arm portion extended laterally and then downwardly, a rigid strut fixed rigidly to said downwardly extended portion of said arm, said strut in the upper portion immediately below said arm being bent to a laterally and downwardly sloping relation to define, with said arm, a laterally opening clearance space located on one side of said strut and within which the upper tread portion of a wheel may be disposed in a plane including said axis, and the lower portion of said strut being extended for a substantial distance in a plane parallel to said last mentioned plane, a wheel-mounting axle fixed to said lower portion of said strut and projecting from said one side thereof in a direction perpendicular to said planes as a support for said wheel, and flat mounting surfaces formed on the other side of said lower portion of said strut against which a driving engine may be secured.

7. In a mounting structure for steerably mounting a front wheel and a drive motor therefor in the steering column of a bicycle or the like, an elongated upwardly extending steering head adapted for mounting in the steering column of a bicycle or the like for steering movement about a predetermined axis defined by said steering head, a strut structure rigid with the lower end of said steering head and having an arm portion extended laterally from said steering head and then downwardly, said strut structure terminating in a flat rigid bar which immediately below said arm is bent to a downwardly sloping relation that slopes laterally in a direction generally opposite to the direction in which said arm extends to thereby define, with said arm, a laterally opening clearance space located on one side of said bar and within which the tread portion of a wheel may be disposed in a plane including said axis, and the lower portion of said bar being extended for a substantial distance in a plane parallel to said last mentioned plane, a wheel-mounting axle mounted on said lower portion of said bar and projecting from said one side thereof in a direction perpendicular to said planes to rotatably support said wheel, and engine mounting means including mounting surfaces formed on the other side of said lower portion of said bar against which a driving engine may be secured.

8. In a mounting structure for steerably mounting a front wheel and a drive motor therefor in the steering column of a bicycle or the like, an elongated upwardly extending steering head adapted for mounting in the steering column of a bicycle or the like for steering movement about a predetermined axis defined by said steering head, a downwardly extending strut structure rigid with the lower end of said steering head and having a lower end portion disposed in substantially the vertical plane of said axis, a wheel-mounting axle mounted on said lower portion of said strut and projecting from one side thereof in a first direction perpendicular to said plane, said strut structure in the upper portion thereof being formed with a laterally opening clearance space located on the same side of said strut as said stud and within which the tread portion of a wheel may be disposed in a plane including said axis, mounting surfaces formed on the other side of said lower portion of said strut against which a driving engine may be secured, and a driving engine having the crankcase thereof attached to said mounting surfaces.

9. In a power wheel assembly for driving and partially supporting a wheeled vehicle such as a bicycle, a wheel comprising a laterally convex disc having a central axial bearing structure disposed within the cancave face of the disc and having an outer road-engaging rim disposed at the edge of said disc, a strut support disposed within said cancave side of said disc and in substantially the plane of said rim and having a rigid axle projecting in one direction from one face thereof and engaging said bearing structure to rotatably relate said wheel to said strut support, a driving engine mounted on the other face of said strut support and operatively connected to said wheel for driving the same, said strut support being elongated in an upward direction and being extended upwardly beyond said engine, then laterally into a position over said engine, then upwardly and past said wheel rim, and then in an opposite lateral direction into a position radially outwardly of and above said rim, and mounting means rigidly associated with said support at that portion thereof that is located outwardly of and above said rim to support a steering column for the wheel.

10. In a power wheel assembly for driving and partially supporting a wheeled vehicle such as a bicycle, a wheel comprising a laterally convex disc having a central axial bearing structure disposed within the concave face of the disc and having an outer road engaging rim disposed at the edge of said disc, a one piece unitary supporting strut disposed within said concave side of said disc and in substantially the plane of said rim and having a rigid axle affixed thereto and projecting in one direction from one face thereof and engaging said bearing structure to rotatably relate said wheel to said strut, a driving engine mounted on the other face of said strut and operatively connected to said wheel for driving the same, said strut being extended past one side of said engine and upwardly to afford a vertical mounting portion for securing the assembly to a vehicle and for transmitting steering movements to the axle.

11. In a power wheel assembly for driving and partially supporting a wheeled vehicle such as a bicycle, a dished wheel comprising a laterally convex disc having a central axial bearing structure disposed within the concave face of the disc and a concentric and outwardly spaced internal brake drum surrounding a part of said bearing structure, said wheel also having an outer road engaging rim disposed at the edge of said disc, brake means disposed about said bearing structure and within and in cooperating relation with respect to said brake drum, a one-piece unitary strut disposed within said concave side of said disc and in substantially the plane of said rim and having a rigid axle affixed to and projecting in one direction from one face thereof and engaging said bearing structure to rotatably relate said wheel to said strut, a brake anchor fixed on said one face of said strut and operatively connected to said brake means to anchor the same, a driving engine mounted on the other face of said strut, a power transmitting element mounted on said brake drum, means operatively connecting said engine to said power transmitting element for driving said wheel, said strut being elongated in an upward direction and being extended upwardly beyond said engine, then laterally into a position over said engine, then upwardly and past said wheel rim, and then in an opposite lateral direction into a position radially outwardly and above said rim, and mounting means for a steering mechanism rigidly associated with said support at that portion thereof that is located outwardly of and above said rim.

12. In a power wheel assembly for driving and partially supporting a wheeled vehicle such as a bicycle, a dished wheel comprising a laterally convex disc having a central axial bearing structure disposed within the concave face of the disc and a concentric and outwardly spaced internal brake drum surrounding a part of said bearing structure, said wheel also having an outer road engaging rim disposed at the edge of said disc, brake means disposed about said bearing structure and within and in cooperating relation with respect to said brake drum, a one-piece unitary support disposed within said concave side of said disc and in substantially the plane of said rim and having a rigid axle projecting in one direction from one face thereof and engaging said bearing structure to rotatably relate said wheel to said support, a brake anchor fixed on said one face of said support and operatively connected to said brake means to anchor the same, a brake operating means mounted on said brake anchor and operatively associated with said brake means for applying braking forces to said drum, a driving engine mounted on the other face of said support, a power transmitting element mounted on said brake drum, means operatively connecting said engine to said power transmitting element for driving said wheel, said support being elongated in an upward direction and being extended upwardly beyond said engine, then laterally into a position over said engine, then upwardly and past said wheel rim, and then in an opposite lateral direction into a position radially outwardly and above said rim, and a pair of column mounting means rigidly associated with said support at that portion thereof that is located outwardly of and above said rim to afford a steering and shock absorbing mechanism for the power wheel.

13. In a power wheel assembly for driving and partially supporting a wheeled vehicle such as a bicycle, a wheel comprising a laterally convex disc having a central axial bearing structure disposed within the concave face of the disc and a concentric and outwardly spaced brake drum surrounding a part of said bearing structure, said wheel also having an outer road engaging rim disposed at the edge of said disc, brake means disposed related to and in cooperating relation with respect to said brake drum, a steering support disposed within said concave side of said disc and in substantially the plane of said rim and having a rigid axle projecting in one direction from one face thereof and engaging said bearing structure to rotatably relate said wheel to said support, a brake anchor fixed on said one face of said support and operatively connected to said brake means to anchor the same, a driving engine mounted on the other face of said support, and operatively connected to said wheel for driving said wheel, said support being elongated in an upward direction and being extended upwardly beyond said engine, then laterally into a position over said engine, then upwardly and past said wheel rim, and then in an opposite lateral direction into a position radially outwardly and above said rim.

14. In a power wheel assembly for driving and partially supporting a wheeled vehicle such as a bicycle, a wheel comprising a laterally convex disc having a central axial bearing structure disposed within the concave face of the disc and a concentric and outwardly spaced internal brake drum surrounding a part of said bearing structure, said wheel also having an outer road engaging rim disposed at the edge of said disc, brake means disposed about said bearing structure and within and in cooperating relation with respect to said brake drum, a steering support disposed within said concave side of said disc and in substantially the plane of said rim and having a rigid axle projecting in one direction from one face thereof and engaging said bearing structure to rotatably relate said wheel to said support, a brake anchor fixed on said one face of said support and operatively connected to said brake means to anchor the same, a driving engine disposed on the other face of said support, pivot means on said support located eccentrically with respect to said axle and pivotally supporting one portion of said engine on said support, adjustable means spaced from said pivot means for adjustably pivoting said engine about said pivot means, a first sprocket mounted on said brake drum, a second sprocket mounted on said engine and driven thereby, a driving chain operatively connecting said sprockets for driving said wheel and being adapted for adjustable tightening by said adjustable means, said support being elongated in an upward direction and being extended upwardly beyond said engine, then laterally into a position over said engine, then upwardly and past said wheel rim, and then in an opposite lateral direction into a position radially outwardly and above said rim, and steering means rigidly associated with said support at that portion thereof that is located outwardly of and above said rim whereby steering movements imparted to said support may be transmitted thereby directly to said wheel.

15. In a power wheel assembly for driving and partially supporting a wheeled vehicle such as a bicycle, a dished wheel having a rim and having a central axial bearing structure disposed within the concave side thereof, a steering strut support disposed within said concave side of said dished wheel and in substantially the plane of said rim and having a rigid axle affixed to and projecting in one direction from one face thereof and engaging said bearing structure to rotatably relate said wheel to said support, a driving engine mounted on the other face of said support, a power transmitting element rigidly related to said wheel, means including a chain and sprocket operatively connecting said engine to said wheel for driving said wheel, said support being elongated in an upward direction and being extended upwardly beyond said engine, then laterally into a position over said engine, then upwardly and past said wheel rim, and then in an opposite lateral direction into a position radially outwardly and above said rim, mounting means rigidly associated with said support at that portion thereof that is located outwardly of and above said rim, and mounting means on the engine side of said support for adjusting the position of said engine on said support for varying the tightness of said chain.

16. In a power wheel assembly for driving and partially supporting a wheeled vehicle such as a bicycle, a dished wheel having a rim and having a central axial bearing structure disposed within the concave face, and also having a concentric and outwardly spaced brake drum surrounding said bearing structure, a brake means disposed in cooperating relation with respect to said brake drum, a steering support disposed within said concave side of said wheel and in substantially the plane of said rim and having a rigid axle projecting in one direction from one face thereof and engaging said bearing structure to rotatably and steerably relate said wheel to said support, a brake anchor fixed on said one face of said support and operatively connected to said brake means to anchor the same, a driving engine mounted for adjusting movement in a predetermined direction on the other face of said support, mounting means on said other face of said support affording adjusting movement for the engine, a first sprocket operatively connected to said wheel for driving said wheel, a second sprocket mounted on and driven by said engine and disposed in the plane of said second sprocket a chain connecting said sprockets, said sprockets being spaced apart in substantially said predetermined direction so that adjustment of said engine on support is effective to adjust the chain tension, said support being elongated in an upward direction as being extended upwardly and laterally beyond said engine for effectually mounting said assembly on a vehicle, and handle bar steering means connected to said lateral extension of the steering support for transmitting steering movements through the support directly to said axle.

17. In a power wheel assembly for driving and partially supporting a wheeled vehicle such as a bicycle, a dished wheel having a rim and having a central axial bearing structure disposed within the concave face, and also having a concentric and outwardly spaced brake drum surrounding a part of said bearing structure, a brake means disposed in cooperating relation with respect to said brake drum, a one-piece unitary wheel and engine strut support disposed within said concave side of said wheel and in substantially the plane of said rim and having a rigid axle affixed to and projecting in one direction from one face thereof and engaging said bearing structure to rotatably and steerably relate said wheel to said support, a brake anchor fixed on said one face of said support and operatively connected to said brake means to anchor the same, a driving engine mounted for adjusting movement in a predetermined direction on the other face of said support, mounting means on said other face of said support affording adjusting movement for the engine, a first sprocket mounted on said brake drum for driving said wheel, a driving shaft mounted on and driven by said engine and extended past one edge of said support and beyond the plane of said first sprocket, a second sprocket mounted on and driven by said shaft and disposed in the plane of said second sprocket a chain connecting said sprockets, said sprockets being spaced apart in substantially said predetermined direction so that adjustment of said engine on support is effective to adjust the chain tension, said support being elongated in an upward direction and being extended upwardly and laterally beyond said engine for effectually mounting said assembly on a vehicle in a steering relation.

18. In a power wheel assembly for driving and partially supporting a wheeled vehicle such as a bicycle, a dished wheel having a rim and having a central axial bearing structure disposed within the concave face, and also having a concentric and outwardly spaced brake drum surrounding a part of said bearing structure, a brake means disposed in cooperating relation with respect to said brake drum, a support disposed within said concave side of said wheel and in substantially the plane of said rim and having a rigid axle projecting in one direction from one face thereof and engaging said bearing structure to rotatably relate said wheel to said support, a brake anchor fixed on said one face of said support and operatively connected to said brake means to anchor the same, a driving engine having a projecting power output shaft and a crankcase including a side plate disposed in a plane perpendicular to said power output shaft, means securing said side plate of said crankcase for adjusting movement of said plate and said engine in a predetermined direction on the other face of said support and with said output shaft extending laterally past one edge of said support, a first sprocket operatively connected to said wheel for driving said wheel, a second sprocket mounted on said output shaft in the plane of said second sprocket a chain connecting said sprockets, said sprockets being spaced apart in substantially said predetermined direction so that adjustment of said engine on said support is effective to adjust the chain tension, said support being elongated in an upward direction and being extended upwardly and laterally beyond said engine for effectually mounting said assembly on a vehicle.

19. In a power wheel assembly for driving and partially supporting a wheeled vehicle such as a bicycle, a dished wheel having a rim and having a central axial bearing structure disposed within the concave face, and also having a concentric and outwardly spaced brake drum surrounding a part of said bearing structure, a brake means disposed in cooperating relation with respect to said brake drum, a support disposed within said concave side of said wheel and in substantially the plane of said rim and having a rigid axle projecting in one direction from one face thereof and engaging said bearing structure to rotatably relate said wheel to said support, a brake anchor fixed on said one face of said support and operatively connected to said brake means to anchor the same, a driving engine having a projecting power output shaft and a crankcase including an elongated side plate disposed in a plane perpendicular to said power output shaft, pivot means securing one end of said side plate to the other side of said support for pivotal movement on an axis parallel to said axle, means securing the other end of said side plate to said support for adjusting movement of said plate and said engine about said pivot means and in a predetermined direction, said output shaft extending laterally past one edge of said support, a first sprocket operatively connected to said wheel for driving said wheel, a second sprocket mounted on said output shaft in the plane of said second sprocket a chain connecting said sprockets, said sprockets being spaced apart in substantially said predetermined direction so that adjustment of said engine on said support is effective to adjust the chain tension, said support being elongated in an upward direction and being extended upwardly and laterally beyond said engine for effectually mounting said assembly on a vehicle.

20. In a mounting structure for steerably mounting a front wheel and a drive motor therefor in the steering column of a bicycle or the like, a bracket having an arm portion extended laterally and then downwardly, an inner sleeve rigidly fixed to the arm portion of said bracket and projecting upwardly from said bracket to define a steering axis, an outer sleeve slidably surrounding the upper portion of said sleeve, an upper bar embodying a handlebar mount and releasably connected to the upper end of said outer sleeve, bearing means mounted on said outer sleeve and adapted to engage a steering column to afford a rotative mounting of said outer sleeve with respect to such a steering column, spring means active between said bracket and said upper bar to resist upward displacement of said inner sleeve relative to said outer sleeve, means for resiliently limiting downward movement of said inner sleeve relative to said outer sleeve, a rigid strut fixed rigidly to said downwardly extended portion of said arm, said strut in the upper portion immediately below said arm being bent to a laterally and downwardly sloping relation to define, with said arm, a laterally opening clearance space located on one side of said strut and within which the upper tread portion of a wheel may be disposed in a plane including said axis, and the lower portion of said strut being extended for a substantial distance in a plane parallel to said last mentioned plane, a wheel-mounting stud mounted on said lower portion of said strut and projecting from said one side thereof in a direction perpendicular to said planes, and mounting surfaces formed on the other side of said lower portion of said lower portion of said strut against which a driving engine may be secured.

References Cited in the file of this patent

UNITED STATES PATENTS

| | | |
|---|---|---|
| 783,236 | Ashburn | Feb. 21, 1905 |
| 1,273,170 | Fisher | July 23, 1918 |
| 1,295,092 | Smith | Feb. 18, 1919 |
| 1,308,602 | Mennesson | July 1, 1919 |
| 1,394,516 | Burlat et al. | Oct. 18, 1921 |
| 2,019,620 | McCleod | Nov. 5, 1935 |
| 2,233,313 | Hazelroth | Feb. 25, 1941 |
| 2,477,748 | Hutchins | Aug. 2, 1949 |
| 2,483,177 | Bobard | Sept. 27, 1949 |
| 2,588,889 | Sherwood | Mar. 11, 1952 |

FOREIGN PATENTS

| | | |
|---|---|---|
| 467,168 | Great Britain | June 7, 1937 |